K. W. SONNTAG.
TIRE TESTING MACHINE.
APPLICATION FILED OCT. 10, 1912.
1,068,180.
Patented July 22, 1913.
2 SHEETS—SHEET 2.
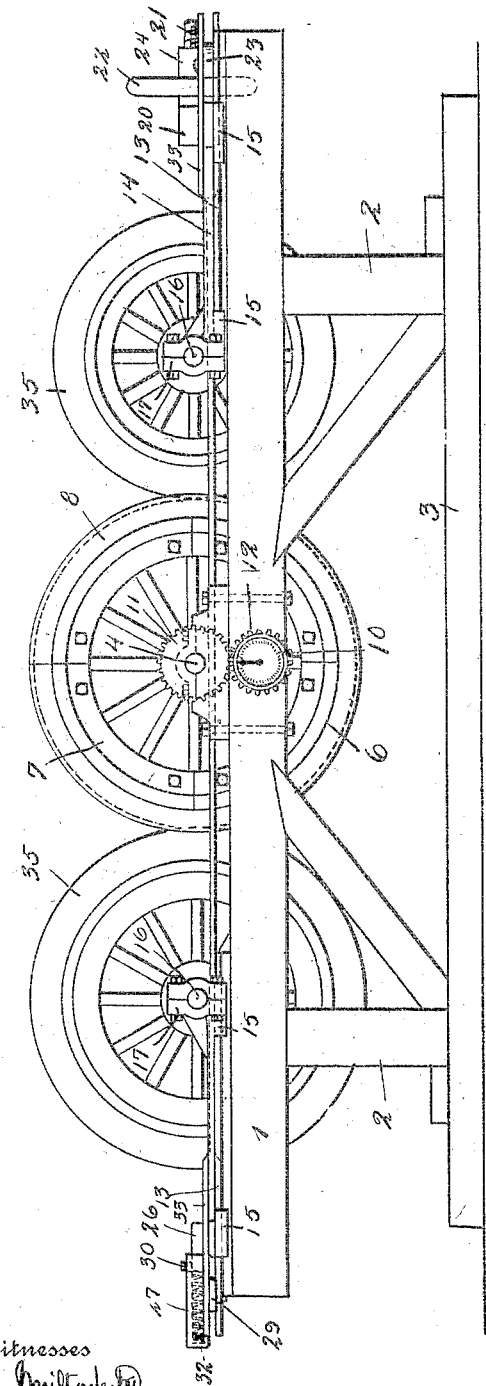
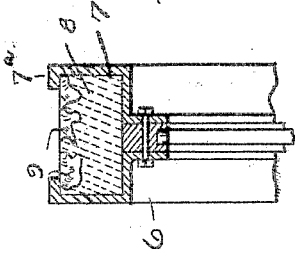
Witnesses
Inventor
Karl W. Sonntag
By
Attorney

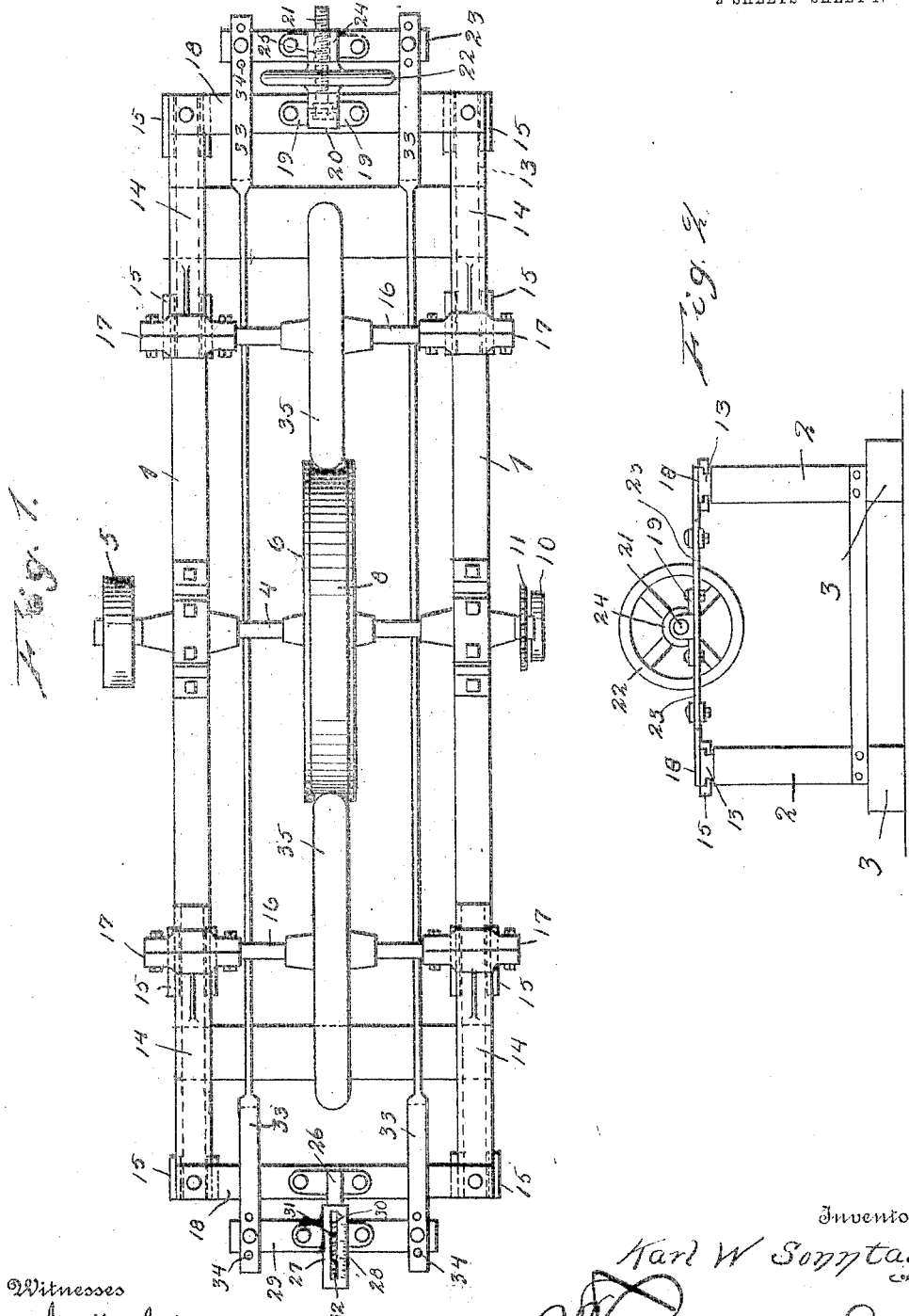

UNITED STATES PATENT OFFICE.

KARL W. SONNTAG, OF ST. LOUIS, MISSOURI.

TIRE-TESTING MACHINE.

1,068,180.    Specification of Letters Patent.    Patented July 22, 1913.

Application filed October 10, 1912. Serial No. 725,084.

*To all whom it may concern:*

Be it known that I, KARL W. SONNTAG, a citizen of the United States, residing at St. Louis, State of Missouri, have invented certain new and useful Improvements in Tire-Testing Machines, of which the following is a specification.

The invention relates to machines for testing tires used on vehicles and has for its object the provision of a machine comprising a wheel having its periphery provided with surfaces resembling the different kinds of roadways over which vehicles ordinarily travel, said wheel being adapted to be rotated at different speeds to be indicated by a speedometer, and slidably mounting adjacent to said wheels, shafts on which are journaled the wheels to be tested, the engagement of said wheels being regulated as desired by the operator.

My invention will be described in detail hereinafter and illustrated in the accompanying drawings, in which, Figure 1 is a top plan view of my improved tire testing machine; Fig. 2, an end view; Fig. 3, a side view in elevation; and Fig. 4, a fragmental cross sectional view of the testing wheel.

In the drawings similar reference characters will be used to designate corresponding parts.

My improved tire testing machine comprises side sills 1 mounted on upright supports 2 that are secured to a suitable base 3. Journaled intermediate of the terminals of the sills 1 is a shaft 4 that is rotated by any suitable motor connected with said shaft by means of the pulley 5, and mounted on said shaft is a wheel 6 having a channeled rim 7 provided with inturned flanges 7ª to receive an annulus 8 of cement or other plastic material having embedded therein stones, brick, wooden blocks or the like, indicated generally at 9, before said annulus 8 hardens in the process of molding. It will be understood that the annulus 8 is to have different portions of its surface provided with different kinds of wear material such as described so that the tires being tested will be subjected to substantially the same conditions that they would be when passing over ordinary roadways.

10 indicates a speedometer suitably mounted adjacent to the shaft 4 and geared to said shaft by means of pinions 11 and 12 to indicate the speed at which the shaft 4 may be operated.

The two terminals of each of the sills 1 have their upper surfaces provided with grooved extensions 13 on which are slidably mounted bars 14 by means of flanged clips 15 engaging said grooved extensions 13, each pair of said bars 14 having a shaft 16 journaled in suitable bearings 17 mounted thereon and the outer terminals of said bars 14 are connected by means of cross bars 18. Secured to one of the cross bars 18 by means of ears 19 is a block 20 having a threaded extension 21 on which is mounted a hand wheel 22, and 23 indicates a plate having a block 24 secured thereto and provided with a bore 25 to receive the threaded extension 21. The cross bar 18 at the other end of the machine frame has one member 26 of a pressure gage 27 secured thereto, while the other member 28 of said pressure gage is secured to a plate 29, said pressure gage being as shown in Fig. 1 in the nature of a spring balanced scale, the member 28 being cylindrical, while the member 26 is slidably mounted within said cylinder and provided with a pintle 30 extending through a slot 31 in the member 28, 32 indicating the spring mounted in said member 28 and engaging the end of the member 26.

33 indicate rods connecting corresponding terminals of the plates 23 and 29, said rods 33 having their terminals provided with a plurality of openings 34 to which the plates 23 and 29 may be connected so as to adjust the pressure of the wheels to be hereinafter described on the surface of the annulus 8.

35 indicate vehicle wheels mounted on the shaft 16 and in position to be tested by the machine.

In operation it will be apparent that after the wheels 35 are mounted on the shaft 16 and the pressure of the rims of said wheels on the annulus 8 is regulated by means of the hand wheel 22 and indicated by the pressure gage 27, the shaft 4 is rotated and by the engagement of the annulus 8 with the rims of said wheels 35, said wheels will be actuated and bearing against the surface of said annulus will cause the rims of said wheels to experience the same wearing action that they would if used on a car passing over roadways having different surfaces, the speed at which the shaft 4 is rotated being indicated as heretofore stated by means of the speedometer 10.

It will be apparent that by my improved construction the pressure of the wheels on the annulus 8 may be adjusted to correspond with the pressure of the wheels on the roadway when the vehicle is run light or loaded as desired and furthermore, that the wearing qualities of the tires at different speeds may be clearly ascertained through the use of the speedometer as described.

Having thus described my invention what I claim is:—

1. In a tire testing machine, side sills suitably supported, a shaft journaled intermediate of the ends of said sills, means to rotate said shaft, a wheel secured to said shaft, the rim of said wheel having embedded therein materials corresponding to different classes of roadway surfaces, bars slidably mounted on said sills, shafts journaled on said bars and adapted to receive vehicle wheels and hold them in engagement with the rim of the first mentioned wheel, and means to adjust said bars relatively to the first mentioned wheel to regulate the pressure of the wheels mounted on the last mentioned shafts on said wheel.

2. A tire testing machine comprising side sills, a shaft journaled intermediate of the ends of said side sills, means to rotate said shaft, a testing wheel secured to said shaft, bars slidably mounted on said side sills and having shafts mounted thereon and adapted to receive vehicle wheels to be tested, cross bars connecting the first mentioned bars in pairs, a plate mounted adjacent to each of said cross bars, the terminals of said plates being connected by means of rods, a pressure gage mounted on one of said cross bars and the plate adjacent thereto, and means mounted on the other cross bar and the plate adjacent thereto to adjust the cross bars relatively to said plates.

In testimony whereof I affix my signature in presence of two witnesses.

KARL W. SONNTAG.

Witnesses:
ANTHONY J. WARNUSS,
ED. DAIRR.